(12) United States Patent
Gritzer et al.

(10) Patent No.: US 7,010,109 B2
(45) Date of Patent: Mar. 7, 2006

(54) DIGITAL RECORDING OF IP BASED DISTRIBUTED SWITCHING PLATFORM

(75) Inventors: Hagay Gritzer, Maccabim (IL); Ilan Freedman, Petach Tikva (IL); Ilan Yosef, Pardesiia (IL); Danny Shporer, Rchovot (IL)

(73) Assignee: Nice Systems Ltd., Raanana (IL)

( * ) Notice: Subject to any disclaimer, the term of this patent is extended or adjusted under 35 U.S.C. 154(b) by 0 days.

(21) Appl. No.: 10/906,962

(22) Filed: Mar. 14, 2005

(65) Prior Publication Data

US 2005/0123115 A1    Jun. 9, 2005

Related U.S. Application Data

(63) Continuation of application No. 10/111,767, filed as application No. PCT/IL01/00805 on Aug. 28, 2001.

(60) Provisional application No. 60/228,124, filed on Aug. 28, 2000.

(51) Int. Cl.
*H04M 3/42* (2006.01)

(52) U.S. Cl. .......................... 379/202.01; 379/203.01; 379/265.06; 379/265.09

(58) Field of Classification Search ............. 348/14.08, 348/14.09, 14.1; 370/260, 261; 379/93.21, 379/158, 202.01, 205.01, 265.02, 265.09; 709/204

See application file for complete search history.

(56) References Cited

U.S. PATENT DOCUMENTS

| | | | |
|---|---|---|---|
| 5,099,510 A | 3/1992 | Blinken et al. | |
| 5,101,402 A | 3/1992 | Chiu et al. | |
| 5,559,875 A | 9/1996 | Bieselin et al. | |
| 5,710,591 A | 1/1998 | Bruno et al. | |
| 5,717,879 A | 2/1998 | Moran et al. | |
| 5,719,786 A | 2/1998 | Nelson et al. | |
| 5,764,901 A | 6/1998 | Skarbo et al. | |
| 5,787,253 A | 7/1998 | McCreery et al. | |
| 5,841,977 A | 11/1998 | Ishizaki et al. | |
| 5,893,053 A | 4/1999 | Trueblood | |
| 5,963,913 A | 10/1999 | Henneuse et al. | |
| 5,978,835 A | 11/1999 | Ludwig et al. | |

(Continued)

FOREIGN PATENT DOCUMENTS

WO    WO 99/46702    9/1999

(Continued)

OTHER PUBLICATIONS

Toshiaki Koyama et al, Personal Multimedia Communication Systems, 8297 Hitachi Review 44 (1995) Aug., No. 4, Tokyo, Japan, p. 207-212.

(Continued)

*Primary Examiner*—Bing Q. Bui
(74) *Attorney, Agent, or Firm*—Hershkovitz & Associates; Abe Hershkovitz (57) ABSTRACT

A system and method for recording and/or otherwise monitoring IP multimedia sessions. The present invention features a recording and/or monitoring device, referred to hereinafter as "a recording device" for the purposes of clarity only and without any intention of being limiting. The recording device is a participant in the IP multimedia session, although preferably the recording device only receives data for recording and/or otherwise monitoring the session. Therefore, the IP multimedia session is preferably a multi-user session, such as a "conference call" for example, even if data is being provided for recording from only one of the participants in the session.

94 Claims, 5 Drawing Sheets

U.S. PATENT DOCUMENTS

| | | | |
|---|---|---|---|
| 6,006,253 | A | 12/1999 | Kumar et al. |
| 6,047,060 | A | 4/2000 | Fedorov et al. |
| 6,108,782 | A | 8/2000 | Fletcher et al. |
| 6,122,665 | A | 9/2000 | Barr et al. |
| 6,181,784 | B1 | 1/2001 | Duran et al. |
| 6,288,739 | B1 | 9/2001 | Hales et al. |
| 6,311,231 | B1 | 10/2001 | Bateman et al. |
| 6,320,588 | B1 | 11/2001 | Palmer et al. |
| 6,356,294 | B1 | 3/2002 | Martin et al. |
| 6,418,214 | B1 | 7/2002 | Smythe et al. |
| 6,480,584 | B1 | 11/2002 | Duran et al. |
| 6,490,344 | B1 | 12/2002 | Murai et al. |
| 6,535,909 | B1 | 3/2003 | Rust |
| 6,542,602 | B1 | 4/2003 | Elazar |
| 6,668,273 | B1 | 12/2003 | Rust |
| 6,690,663 | B1 | 2/2004 | Culver |

FOREIGN PATENT DOCUMENTS

| | | |
|---|---|---|
| WO | WO 02/19620 | 3/2002 |

OTHER PUBLICATIONS vat-LBNL Audio Conferecing Tool, http://web.archive.org/web/19980126183021/ww-nrg.ee.lbl.gov/vat (5 pages).

mash-developers@mash.cs.berkeley.edu, "Vic-video conference", http://web.archive.org/web/19980209092254/mash. Last updated Mon. Sep. 8, 1997.

Suchitra Raman & Angela Schuett, Department of EECS, University of California, Berkeley "On-demand Remote Playback", 10 pages.

International Telecommunication Union, Telecommunication Standardization Sector of ITU, Series H: Audiovisual And Multimedia Systems, Infrastructure of audiovisual services- Systems and terminal equipment for audiovisual services. "Packet-based multimedia communication systems," H.323 (Feb. 1998), 116 pages.

International Telecommunication Union, Series H: Audiovisual and Multimedia Systems, Infrastructure of audiovisual services-Transmission multiplexing and synchronization, "Call singalling protocols and media stream packetization for packet-based multimedia communication systems," ITU-T Recommendation H.225.0, Printed in Switzerland, Geneva, 1998.

International Telecommunication Union, Series H: Audiovisual and multimedia Systems, Infrastructure of audiovisual services-Communication procedures, "Control protocol for multimedia communication," Recommendation H.245.

Intel., Intel support applications & Technical notes, "Intel Internet Video Phone Trial Applet 2.1, The Problems and Pitfalls of Getting H.323 Saftey ThroughFirewalls", http://web/archive.org/web/19980425132417/http://support.intel.com/support/videophone/trial21/h323_wpr.htm#a18 (32 pages).

Google Groups:comp.security.firewalls "Netmeeting through a packet-filter", http://groups-beta.google.com/group/comp.security.firewalls/browse_thread/thread/c14c3ac7d190a58/a4010ede22ff83a0 (4 pages).

Google Groups: muc.lists.firewalls, "MS Netmeeting 2.0 abd Raptor Eagle vers. 4.0", http://groups-beta.google.com/group/muc.lists.firewalls/browse_thread/thread/ec0255b64bf36ad4?vc=2 (3 pages).

Communication Solution CTI News Vendor to Vendor Headlines, http://www.tmcnet.com/articles/ctmimag/0699/0699news.htm (15 pages), Jun. 1999.

Radcom, Lattency & Loss Measurements, "Breakthrough Internetworking Application for Latency & Loss Measurements from RADCOM," http://web.archive.org/web/19980527022443/www.radcom-inc.com/press21htm, Tel Aviv, Apr. 1997, 2 pages.

Radcom Press Releases, "New VolP Testing Applications from RADCOM," Tel Aviv, Feb. 9, 1999, http://www.radcom.com/radcom/about/pr020999.htm, 2 pages.

Radcom, Supported Protocols, "Protocols, protocols, protocols. . . ," http://web.archive.org/web/19980527014033/www.radcom-inc.com/protocol.htm, 10 pages.

Radcom, "RADCOM Adds Uni 4.0 Signalling and MPEG-II Support to ATM Analysis Solutions," http://web.archive.org/web/19980527022611/www.radcom-inc.com/press13.htm, Tel Aviv, Isreal, Nov., 1996.

Network Computing, "Voice Over IP, The Way It Should Be", http://www.nwc,com/1001/1001ws12html (5 pages) Jan. 11, 1999.

Network Computing, "Hear it for yourself: Audio samples from our H.323 tests", http://www.nwc.com/1001/1001ws2.html, (7 pages) Jan. 11, 1999.

Radcom, "Prism200 Multiport WAN/LAN/ATM Analyzer", http://web.archive.org/web/19980527020144/www.radcom-inc.com/pro-p1.htm (3 pages).

Etherpeek, the ag group, inc., "Ethernet network analysis software" user manual for windows Version 2.0 user's guide (171 pages).

Robert J. Kohlhepp, Network Computing, Interactive Buyer's Guide, Reviews, "AG Groups's Skyline/Satallite Combination Offers Bird's-Eye View of Network Traffic", http://ibg.networkcomputing.com/612/612skyline.html (7 pages).

Mel Beckman, NetMeter 1.0 "See and hear your network", http://web.archive.org/web/19990224183147/macworld.zdnet.com/pages/june.96/Reviews.2144.html (3 pages).

AG Group, Inc. Skyline/Satellite, About Skyline/Satellite "A uick look at Skyline/Satellite", http://web.archive.org/web/19980206033053/www.aggroup.com/skyline/.

Checkpoint, Products & Solutions, Supported Applications "Audio/Video Streaming", http://web.archive.org/web/19980212233542/www.checkpoint.com/products/technology/index.html. (6 pages).

Dameon D. Welch-Albernathy, Check point log Reporter, "Re:[fw1-wizards] tcpdump for Solaris 2.6" http://oldfaq.phoneboy.com/gurus/200007/msg00081.html (2 pages).

Checkpoint Products Solutions, "Stateful Inspection Action, " http://web.archive.org/web/19980212235911/www.checkpoint.com/products/technology/page 2.html, 4 pages.

Checkpoint, Products Solutions, Tech note, "Check Point Firewall-1: Extensible Stateful Inspection," http://web.archvice.org/web/19980212235917/www.checkpoint.com/products/technology/page3.html, 3 pages.

Radcom, Prismlite: Portable WAN/LAN/ATM Protocol, http://web.archive.org/web/19980527020156/www.radcom-inc.com/pro-p2.htm, 3 pages.

Viewing RTPDump Files, http://bmrc.berkeley.edu/-davesimp/viewingNotes.html, David Simpson, Oct. 12, 1996, (1 page).

S. Waldbusser, Carnegie Mellon University "RFC 1757- Remote Network Monitoring Management Information Base", http://www.faqs.org.rfcs/rfc1757.html (65 pages) Feb. 1995.

1994 O'Reilly & Associates, Inc. "Microsoft RIFF" http://netghost.narod.ru/gff/graphics/summary/micriff.htm, (5 pages).

Jacobson, Van and Steven McCanne. "vat—LBNL Audio Conferencing Tool." Aug. 1, 1996. Network Research Group, Lawrence Berkeley National Laboratory. (5 pages).

"Recorder (recorder)." Aug. 27, 1997. MASH Research Group, University of California, Berkeley. (2 pages).

McCanne, Steven and Van Jacobson. "vic—video conference." MASH Research Group, Univeristy of California, Berkeley and Network Reseach Group, Lawrence Berkeley National Laboratory. Archived as of Feb. 9, 1998. (11 pages).

"Player (player)." Sep. 8, 1997. MASH Reseach Group, University of California, Berkeley. (3 pages).

Simpson, David. "Viewing RTPDump Files." Oct. 12, 1996. University of California, Berkeley. (1 page).

Walderbusser, S. "RFC 1757—Remote Network Monitoring Management Information Base." Feb. 1995. Network Working Group, Carnegie Mellon University. (65 pages).

Willis, David. "Voice over IP, The Way It Should Be." Jan. 11, 1999. Network Computing. (5 pages).

"Hear it for yourself: Audio samples from our H.323 tests." Jan. 11, 1999. Netowrk Computing. (7 pages).

"PrismLite: Portable WAN/LAN/ATM Protocol Analyzer." Archived as of May 27, 1998. RadCom. (3 pages).

"CTI News: Vendor To Vendor." Jun. 1999. TMCnet. (15 pages).

"New VoIP Testing Applications from RADCOM." Feb. 9, 1999. RadCom. (2 pages).

"Protocol, protocol, protocol . . ." Archived as of May 27, 1998. RadCom. (10 pages).

"GFF Format Summary: Microsoft RIFF." 1994. O'Reilly & Associates, Inc. (5 pages).

"Etherpeek for Windows: Version 2.0 User's Guide." 1997. The AG Group Inc. 168 pages).

"CU-SeeMe." Cornell University. Undated. (2 pages, printed on Oct. 7, 2005.

"Supported Applications." Archived as of Feb. 12, 1998. Check Point Software Technologies Ltd. (6 pages).

"Re: [fw1-wizards] tcpdump for Solaries 2.6." Jul. 18, 2000. Firewall Wizards Mailing List. (2 pages).

"Stateful Inspection Firewall p. 2." Archived as of Feb. 12, 1998. Check Point Software Technologies Ltd. (4 pages).

"Stateful Inspection Tech Note p. 3." Archived as of Feb. 12, 1998. Check Point Software Technologies Ltd. (3 pages).

Eldridge, Brett. "MS NetMeeting 2.0 and Raptor Eagles vers. 4.0." May 1, 1997. Google Groups, Googles, Inc. (3 pages).

"Archived Tools Overview." Aug. 30, 1997. MASH Research Group, University of California, Berkeley. (1 page).

DIGITAL RECORDING OF IP BASED DISTRIBUTED SWITCHING PLATFORM

CROSS REFERENCE TO RELATED APPLICATIONS

This application is a continuation of U.S. patent application Ser. No. 10/111,767, filed Jun. 24, 2002, of which is hereby incorporated by specific reference.

FIELD OF THE INVENTION

The present invention relates to a system and a method for recording voice and other data passed through IP multimedia sessions, and in particular, for such a system and method in which recording is triggered with the recording device as a participant in the session.

BACKGROUND OF THE INVENTION

Telecommunication is an important aspect of interactions between individuals, as it enables individuals to communicate without being physically present in the same location, thereby potentially increasing the possibilities for cooperation between such individuals. Simultaneously, an increasing number of telecommunication sessions are being monitored and/or recorded, for example for quality assurance at a "help desk" or other customer support center or service.

Previously, such monitoring or recording was relatively simple in the background art. For example, telephone calls may typically be passed to the individual through a PBX (public exchange) switch or CO (central office), which features a central switching matrix. All telephone calls passing this switch would therefore pass through the central matrix, such that integration of the recording and/or monitoring equipment with the central matrix would enable all such telephone calls to be recorded and/or monitored.

Unfortunately, monitoring and/or recording such telephone calls through the IP multimedia session protocols is not as simple. First, the session is multimedia, such that it may combine two or more different types of data. Second, the session does not pass through a central switching matrix, as IP communication does not feature such a matrix. Thus, such communication is relatively diffuse, even across a WAN (wide area network) or LAN (local area network).

The situation is further complicated by the topology of the IP network, which consists of switch boxes, routers and bridges, and which may prevent any recording and/or monitoring system from accessing such communication sessions that are routed on different network segments. In addition, encrypted sessions add a further element of complexity, as access to such sessions is typically only granted to participants, as only participants have access to the necessary information to decrypt the encrypted session.

SUMMARY OF THE INVENTION

The background art does not teach or suggest a solution to the problem of collecting information about an interactive session over an IP network. The background art also does not teach or suggest a solution to the problem of monitoring and/or recording IP multimedia sessions. In addition, the background art does not teach or suggest a solution to the problem of monitoring and/or recording IP multimedia sessions that are routed on different network segments.

The present invention overcomes these problems of the background art by providing a system and method for recording and/or otherwise monitoring IP multimedia sessions. The present invention features a recording and/or monitoring device, referred to hereinafter as "a recording device" for the purposes of clarity only and without any intention of being limiting. The recording device is a participant in the IP multimedia session, although preferably the recording device only receives data for recording and/or otherwise monitoring the session. Therefore, the IP multimedia session is preferably a multi-user session, such as a "conference call" for example, even if data is being provided for recording from only one of the participants in the session. This implementation of the present invention, as described in greater detail below, overcomes such drawbacks of the background art as the inability to otherwise decrypt encrypted sessions, and recording across network segments.

Hereinafter, the term "separate network portion" includes any separate portion or network across which recording is performed, such as a different network segment and/or network for example.

According to a preferred embodiment of the present invention, the recording device is present on a network with a conference control unit, such as a MCU (multi conference unit) for example. Hereinafter, the term "conference" is used to refer to any multi-participant session, even if only two participants are present, one of which is the device of the present invention. The conference control unit either receives a request to initiate the conference call (multimedia session) from the recording device of the present invention and/or from one of the participating IP communication devices, and/or from some other component on the network. Examples of such communication devices include, but are not limited to, IP telephony devices, "smart" IP telephones and computational devices which include an IP telephony component.

According to another optional but preferred implementation of the present invention, the recording device is the NiceLog.TM. product of Nice Systems Ltd of Ra'anana, Israel.

Hereinafter, the term "computational device" refers to any type of computer hardware system and/or to any type of software operating system, or cellular telephones or any type of hand-held device such as a PDA (personal data assistant), as well as to any type of device having a data processor and/or any type of microprocessor, or any type of device which is capable of performing any function of a computer.

For the present invention, a software application or program could be written in substantially any suitable programming language, which could easily be selected by one of ordinary skill in the art. The programming language chosen should be compatible with the computational device according to which the software application is executed. Examples of suitable programming languages include, but are not limited to, C, C++ and Java.

BRIEF DESCRIPTION OF THE DRAWINGS

The invention is herein described, by way of example only, with reference to the accompanying drawings, wherein.

DESCRIPTION OF THE PREFERRED EMBODIMENTS

The present invention is of a system and method for recording and/or otherwise monitoring IP multimedia sessions. The present invention features a recording and/or monitoring device, referred to hereinafter as "a recording device" for the purposes of clarity only and without any intention of being limiting. The recording device is a participant in the IP multimedia session, although preferably the recording device only receives data for recording and/or otherwise monitoring the session. Therefore, the IP multimedia session is preferably a multi-user session, such as a "conference call" for example, even if data is being provided for recording from only one of the participants in the session.

Optionally, only a portion of all such multimedia sessions are recorded, although alternatively, all such sessions are recorded. The recording device may optionally receive a command for determining when a session is to be recorded. Alternatively, the recording device may receive data for all such sessions, but may preferably only record certain sessions. More preferably, a scheduler determines whether the session should be recorded, which may optionally be located with the recording device but alternatively is separated on the network.

According to a preferred embodiment of the present invention, the recording device is present on a network with a conference control unit, such as a MCU (multi conference unit) for example. Hereinafter, the term "conference" is used to refer to any multi-participant session, even if only two participants are present, one of which is the device of the present invention. The conference control unit either receives a request to initiate the conference call (multimedia session) from the recording device of the present invention and/or from one of the participating IP communication devices, and/or from some other component on the network. Examples of such communication devices include, but are not limited to, IP telephony devices, "smart" IP telephones and computational devices which include an IP telephony component.

According to another optional but preferred implementation of the present invention, the recording device is the NiceLog.TM. product of Nice Systems Ltd of Ra'anana, Israel.

According to other optional but preferred embodiments of the present invention, the IP multimedia session may also include one or more non-IP telephony devices, such as a telephone device communicating through the PSTN (public switched telephony network). For this embodiment, the system of the present invention preferably features a gateway for receiving such communication and for enabling the data to be passed to other components of the present invention, including but not limited to the recording device.

According to another optional but preferred implementation of the present invention, the system and method of the present invention are enabled for "hunt groups", which use a plurality of virtual telephone numbers rather than fixed telephone lines that are reserved for particular telephone numbers. Hunt groups are well known in the art; one example of a suitable reference is found in "Newton's Telecom Dictionary", 16th Expanded & Updated Edition, by Harry Newton (published in 2000, by Telecom Books; page 414), which is incorporated by reference as if fully set forth herein. Hereinafter, the term "hunt group" refers to any type of virtual or non-fixed telephone extension systems, in which a central control unit of some type, such as the gatekeeper of the present invention, determines the physical extension which is used.

The present invention may also optionally be implemented with a number of well known protocols in the background art for multimedia IP sessions, including but not limited to H.323, RTP (real time protocol), RTCP (real time control protocol), H.225 and H.245; as well as CODECs for encoding/decoding the multimedia data for such sessions, including but not limited to, G.711, G.723, G.722, G.728, H.261 and H.263; all of which are hereby incorporated by reference as if fully set forth herein. In addition, references may be found at http://www.normos.org/ietf/rfc/rfc18-89.txt as of Aug. 17, 2001, which are also hereby incorporated by reference as if fully set forth herein, including all links and other data/Web pages found at the Web site. Further information may also be found in U.S. Pat. No. 6,122,665, issued Sep. 19, 2000, which is also incorporated by reference as if fully set forth herein.

The principles and operation of the method according to the present invention may be better understood with reference to the drawings and the accompanying description. It should be noted that the present invention is described with regard to IP telephony for the purposes of clarity only and without any intention of being limiting.

Figure 1:
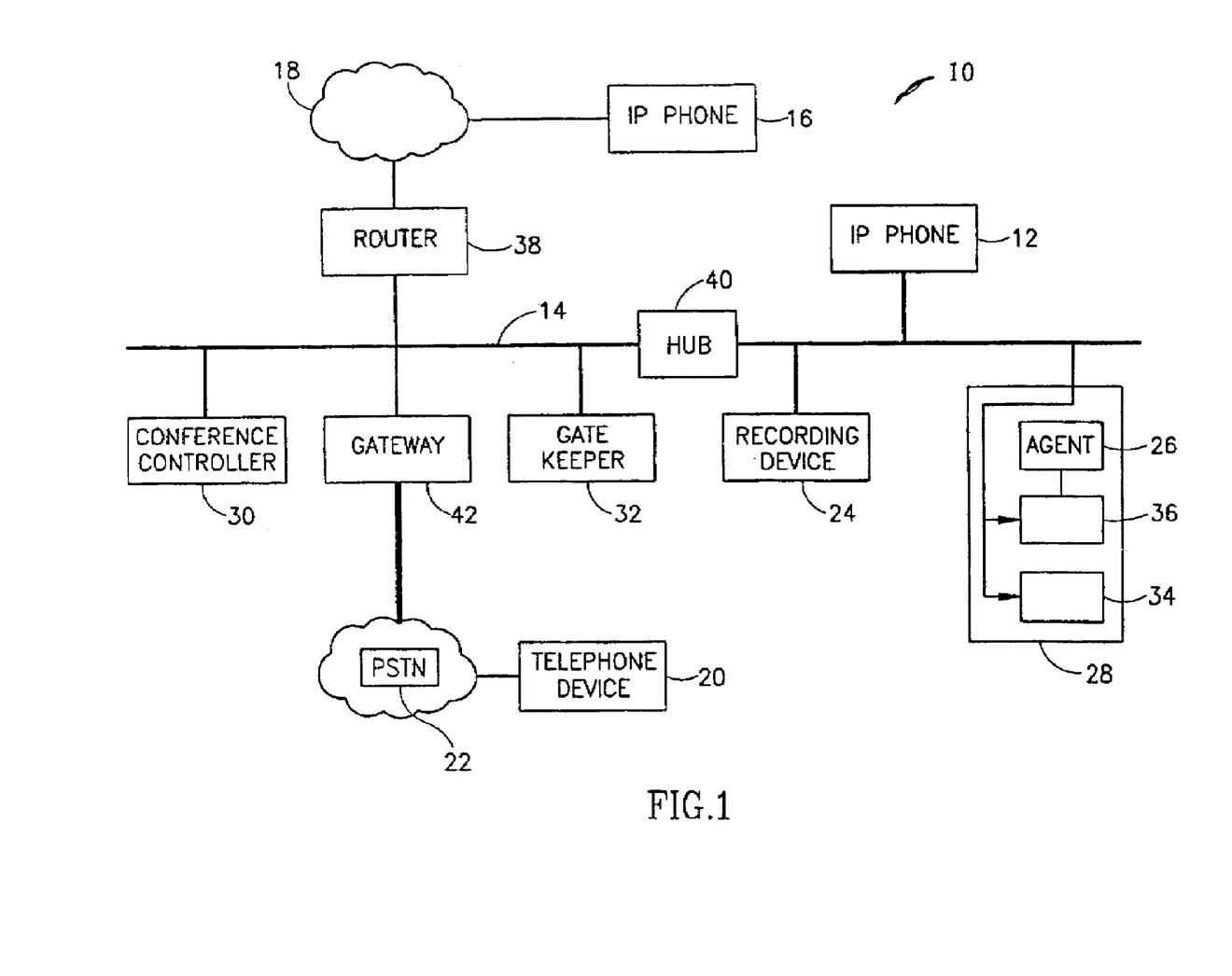
FIG. 1 is a schematic block diagram of an exemplary system according to the present invention.

Referring now to the drawings, FIG. 1 shows an illustrative system 10 for recording and/or otherwise monitoring an IP communication session, which may optionally be a multimedia session. The session may optionally be initiated at any one of an IP telephone 12 on a LAN (local area network) 14; an IP telephone 16 on a WAN (wide area network) 18; and a telephony device 20 communicating through a PSTN (public switched telephony network) 22. Examples of suitable IP telephones include but are not limited to, VIP 30 or SP+12 (Cisco Inc., San Jose, Calif., USA). Preferably, the actual handling of the session is slightly different for each of these different initiating devices, as described in greater detail below.

As shown, LAN 14 features a recording device 24. According to another optional but preferred implementation of the present invention, recording device 24 is the NiceLog.TM. product of Nice Systems Ltd of Ra'anana, Israel. This product features a monitor for monitoring activity through voice telephony on an IP network. Although the activity is monitored through voice telephony protocols, other types of data may also optionally be monitored, such as video and audio data transmissions. The monitor component of the NiceLog.TM. product includes a recording function to record these voice and other types of data transmissions. For example, the recording function may be manually activated to start recording. Further details may be found in the User's Manual of the NiceLog.TM. product.

Recording device 24 is preferably in communication with a recording agent 26 for controlling the process of recording, although optionally both recording device 24 and recording agent 26 may be present in a single device, although separate devices are preferred. Alternatively, recording device 24 may optionally perform all of these functions. Recording agent 26 is preferably operated as a software module by a computational device 28. According to the present invention, upon initiation of the IP multimedia session, recording agent 26 determines that the session has been initiated and directs recording device 24 to record the session. Optionally, only certain sessions are recorded. In order to support recording, the multimedia session is constructed as a conference call, and recording device 24 then becomes a participant in that conference call.

FIG. 1 shows one exemplary implementation for supporting these functions. As shown, LAN 14 also optionally and preferably is connected to a conference controller 30, such as an MCU for example. Conference controller 30 establishes the conference call. Preferably, LAN 14 connects to a gatekeeper 32 according to the H.323 protocol, which translates telephone numbers to IP addresses, and therefore enables the initiating device to locate the other communication device (if present on LAN 14). A non-limiting example of gatekeeper 32 is the MCS 7820 product (Cisco Inc., San Jose, Calif., USA). Gatekeeper 32 may optionally be assisted in performing IP address resolution by a DHCP server (not shown), which is connected to LAN 14. DHCP server assigns IP addresses to IP telephone 12 and to other IP telephones and devices; the assigned addresses are then passed to gatekeeper 32 for performing IP address resolution.

Figure 2:
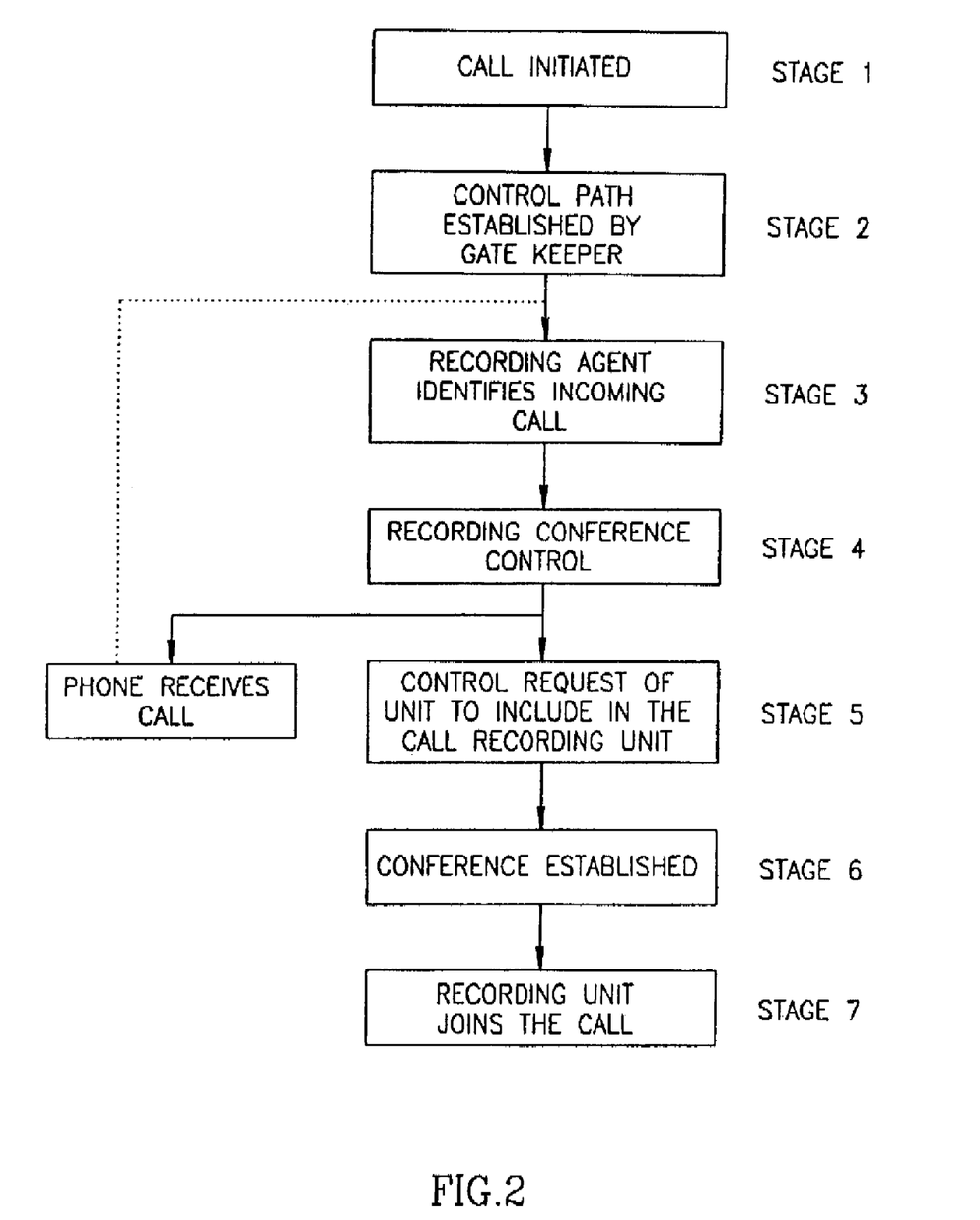
FIG. 2 is a flowchart of an exemplary method according to the present invention for recording and/or otherwise monitoring IP multimedia sessions.

For the first example of initiating device previously given, IP telephone 12 on LAN 14 initiates the session, as explained also with regard to the flowchart of FIG. 2, showing an exemplary method according to the present invention for recording and/or otherwise monitoring IP multimedia sessions. For example, IP telephone 12 may contact gatekeeper 32 to initiate the session with an IP telephone 34 on computational device 28 in stage 1. Both participants are therefore connected through LAN 14.

In stage 2, the control path is established by gatekeeper 32, for example according to the H.323 protocol, in order for the IP session to be initiated. In stage 3, if recording device 24 is not present and/or operational, preferably the normal IP communication session is enabled with IP telephone 34. Alternatively, if recording device 24 is present, then recording agent 26 preferably identifies the incoming request to initiate the session.

In stage 4, a recording agent control module 36, shown with regard to FIG. 1, preferably controls the conference call recording. Optionally and more preferably, recording agent control module 36 sends a request to initiate the conference call to gatekeeper 32. This request preferably includes a request to include recording device 24 in the conference call.

In stage 5, gatekeeper 32 sends a request to conference controller 30 to initiate the IP multimedia session, with recording device 24 as a participant thereof. In stage 6, conference controller 30 initiates the conference call between IP telephone 12 and IP telephone 34. In stage 7, recording device 24 is preferably added to the conference call.

A similar operation is performed if the session is to be established with IP telephone 16 on WAN 18. As shown in FIG. 1, WAN 18 is optionally connected to LAN 14 through a router 38 (LAN 14 may optionally feature a hub 40). IP telephone 12 may again initiate the session by contacting gatekeeper 32; the remaining stages are performed substantially as previously described. Alternatively, IP telephone 16 may initiate the session. In order for IP telephone 16 to initiate the session and the recording, preferably IP telephone 16 features recording agent 26 and recording agent control module 36 as part of a single device. It should be noted that only one of IP telephone 12 and IP telephone 16 requires recording agent 26 and recording agent control module 36, operated directly by the IP telephone itself (in the case of a "smart telephone"), or alternatively operated by a computational device which also operates the IP telephone, in order for the session to be recorded.

The operation is preferably adjusted somewhat if a telephony device 20 communicating through a PSTN 22 is contacted by IP telephone 12 to initiate the multimedia call and/or if telephony device 20 initiates the call. In both cases, communication to and from telephony device 20 passes through a gateway 42, for example in order to translate regular PSTN 22 communication to IP-based communication, such as H.323 protocol-based communication for example. Gateway 42 then preferably contacts gatekeeper 32 in order for telephony device 20 to be recognized as a participant in the session. The remaining functions are similar to those shown in FIG. 2. Gateway 42 may optionally be implemented as a Cisco Internet Router 3620, for example (Cisco Inc., San Jose, Calif., USA).

Figure 3:
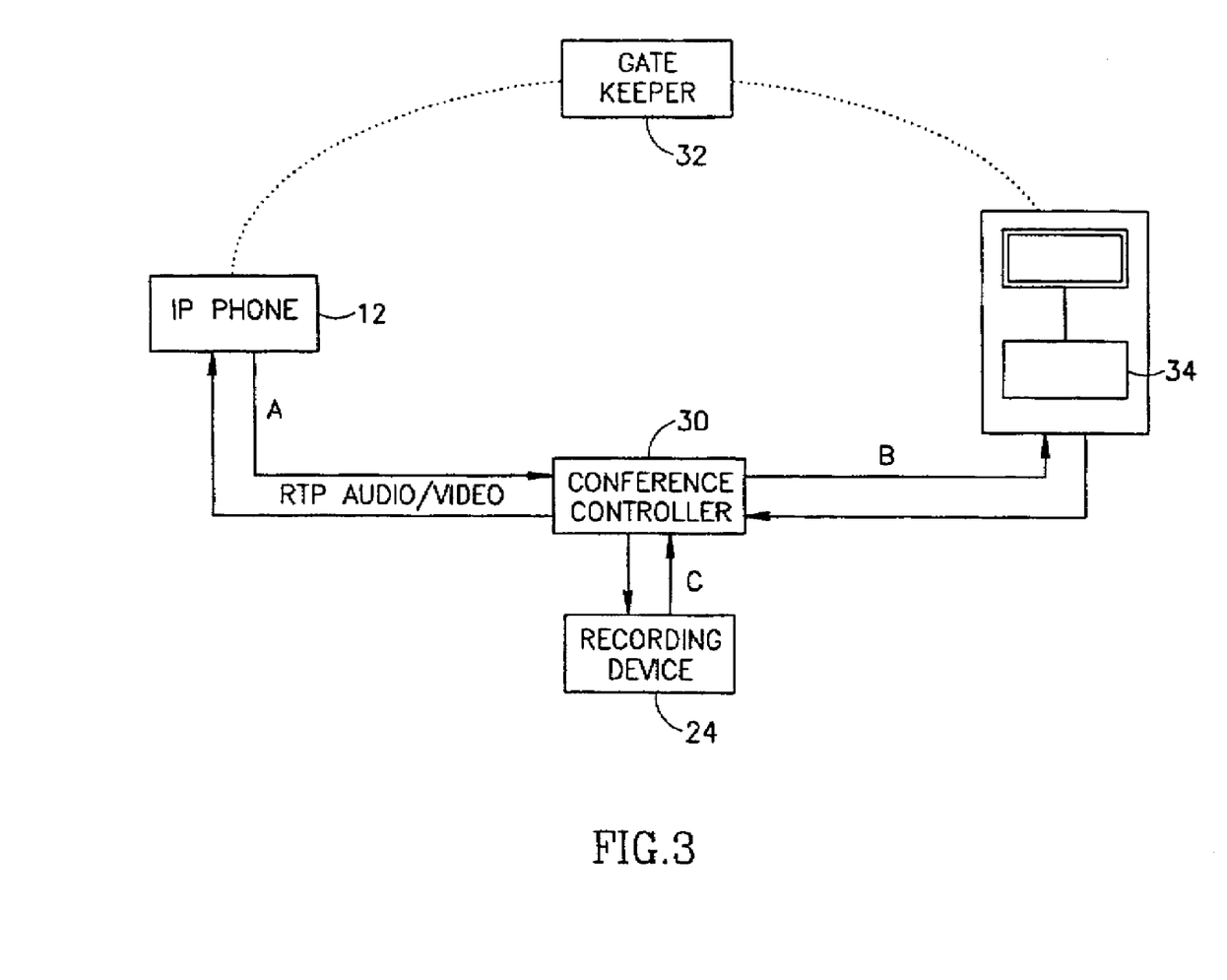
FIG. 3 is a flow diagram of an optional flow of operations according to the present invention.

FIG. 3 shows a flow diagram of an optional flow of operations according to the present invention. As shown, IP telephone 12 initiates the session, through gatekeeper 32, to IP telephone 34. The session is implemented as a conference call. Conference controller 30 enables recording device 24 to participate in the conference call, as well as preferably enabling the conference call itself It should be noted that typically that only information passing through arrows "A" and "B", from each of IP telephone 12 and IP telephone 34 respectively, is recorded. Also, optionally and preferably, recording device 24 only receives communication through arrow For this implementation, recording device 24 preferably has at least one, and more preferably a plurality of, reserved telephone numbers which correspond to actual telephone lines. Video and/or audio data may optionally be captured according to the RTP (real time protocol) protocol.

Figure 4:
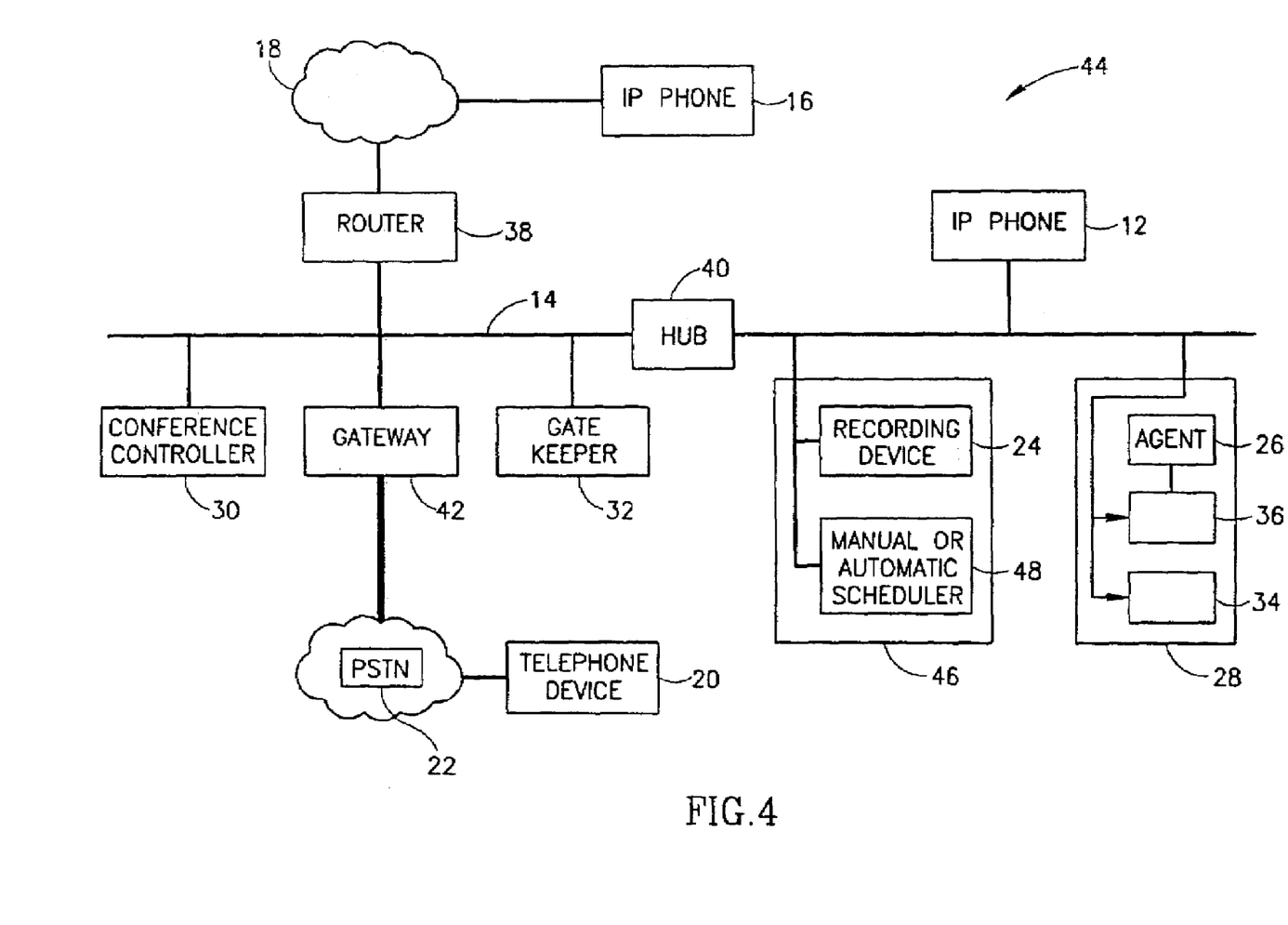
FIG. 4 is a schematic block diagram of a second exemplary system according to the present invention.

FIG. 4 shows another exemplary system 44 according to the present invention for selective recording of sessions. Similar components to FIG. 1 retain the same numbering. Now, recording device 24 is preferably contained within a selective recorder 46, which also features a scheduler 48. Scheduler 48 may optionally be manual or automatic. For the latter implementation, scheduler 48 may optionally analyze information about the IP multimedia session, such as the identity of the initiating and/or receiving device, in order to determine whether the session should be recorded. For the manual implementation, the user at the receiving and/or initiating IP telephony device may optionally determine whether the session should be recorded.

Figure 5:
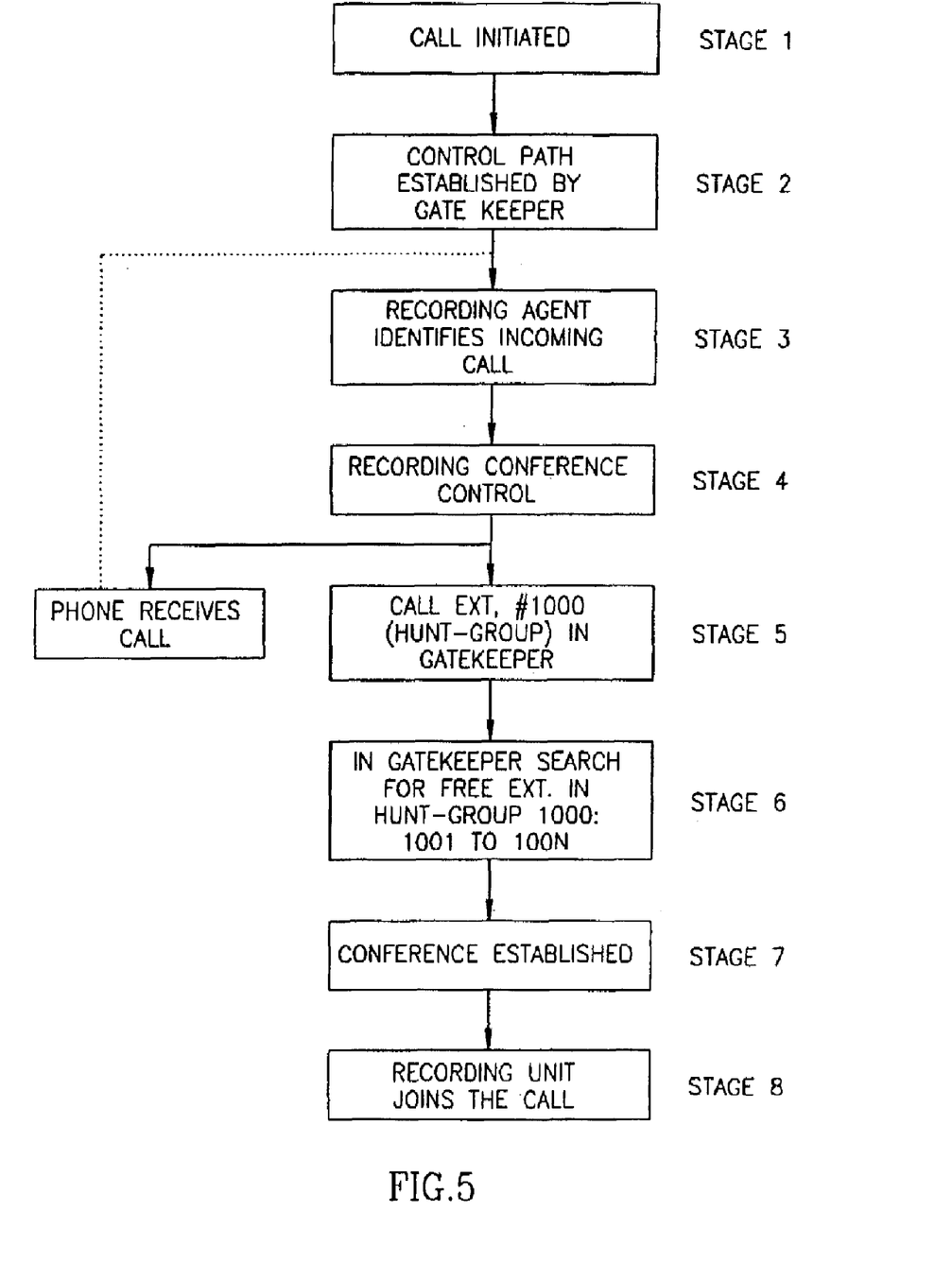
FIG. 5 shows a flowchart of another exemplary method according to the present invention, with regard to the implementation of the present invention with a "hunt group".

FIG. 5 shows a flowchart of another exemplary method according to the present invention, with regard to the implementation of the present invention with a "hunt group". As previously described, hunt groups use a plurality of virtual telephone numbers rather than fixed telephone lines that are reserved for particular telephone numbers. The present invention supports recording and/or otherwise monitoring IP multimedia sessions with such hunt groups as shown in FIG. 5.

This preferred method is similar to that of FIG. 2 for stages 1–4. In stage 5, however, the gatekeeper identifies the hunt group which has been called.

In stage 6, the gatekeeper searches for a free telephone line within that particular hunt group. In stage 7, the conference call is established through the conference controller, and the recording device joins the conference call in stage 8, as previously described.

According to optional but preferred implementations of the present invention, any of the above embodiments may be optionally implemented with a "smart" telephone device in place of the computational device for operating the recording agent and/or the recording agent control module 36.

While the invention has been described with respect to a limited number of embodiments, it will be appreciated that many variations, modifications and other applications of the invention may be made.

What is claimed is:

1. A method for recording at least a portion of one or more of a plurality of IP data sessions, each being between at least a first communication device and a second communication device through a network by a recording device, comprising for each IP data session:
   initiating the data session by said first communication device with said second communication device;
   implementing the data session as a conference call through a conference controller such that said first and second communication devices are connected, respectively, as first and second participants;
   using the conference controller, selectively entering the recording device to said conference call as an additional participant, wherein the recording device is distinct from the first and second communication devices yet receives as the additional participant at least the portion of the IP data session from each of the first and second participants; and
   recording at least the portion of the IP data session received as the additional participant of said conference call using said recording device.

2. The method of claim 1, wherein the step of selectively entering the recording device to said conference call includes the step of directing the recording device to enter said conference call as the additional participant when a data session has been initiated.

3. The method of claim 1, including the additional step of permitting a user of at least one of the first and second communication devices to determine whether the session is to be recorded prior to entering the recording device as the additional participant.

4. The method of claim 1, wherein the connection of the second communication device is established by the conference controller by:
   passing telephone numbers to a gatekeeper for performing IP address resolution, and
   using a resolved IP address of the second communication device for connecting the second communication device to the conference call.

5. The method of claim 1, wherein the step of selectively entering the recording device to said conference call is in response to a command that the data session is to be recorded.

6. The method of claim 5, including the additional step of providing the command from a scheduler.

7. The method of claim 6, including the additional step of locating the scheduler with the recording device.

8. The method of claim 6, including the additional step of analyzing information about the IP data session at the scheduler to determine whether the IP data session is to be recorded.

9. The method of claim 8, wherein the information includes the identity of at least one of the first and second communication devices.

10. The method of claim 1, wherein the IP data session is either an IP telephony session or an IP multimedia session.

11. The method of claim 1, wherein the step of initiating the data session is detected by a recording agent, and wherein said recording agent contacts the recording device.

12. The method of claim 1, wherein said conference controller is a MCU.

13. The method of claim 1, wherein the conference controller implements said conference call in response to a request to initiate the conference call.

14. The method of claim 13, wherein the request is from at least one of the recording device, the first communication device, the second communication device, and an other component on the network.

15. The method of claim 1, wherein said first communication device is a gateway for receiving communication through a PSTN.

16. The method of claim 1, wherein the recording device joins the data session performed through a hunt group.

17. The method of claim 16, including the additional step of identifying the hunt group using a gatekeeper.

18. The method of claim 1, wherein at least one of the first communication device and the second communication device is a non-IP telephony device.

19. The method of claim 18, wherein the step of selectively entering the recording device to said conference call includes the step of directing the recording device to enter said conference call as the additional participant when a data session has been initiated.

20. The method of claim 18, wherein the connection of the second communication device is established by the conference controller by:
   passing telephone numbers to a gatekeeper for performing IP address resolution, and
   using a resolved IP address of the second communication device for connecting the second communication device to the conference call.

21. The method of claim 18, wherein the step of selectively entering the recording device to said conference call is in response to a command that the data session is to be recorded.

22. The method of claim 21, including the additional step of providing the command from a scheduler.

23. The method of claim 22, including the additional step of locating the scheduler with the recording device.

24. The method of claim 22, including the additional step of analyzing information about the IP data session at the scheduler to determine whether the IP data session is to be recorded.

25. The method of claim 24, wherein the information includes the identity of at least one of the first and second communication devices.

26. The method of claim 18, wherein the step of initiating the data session is detected by a recording agent, and wherein said recording agent contacts the recording device.

27. The method of claim 26, wherein said conference controller is a MCU.

28. The method of claim 26, wherein the conference controller implements said conference call in response to a request to initiate the conference call.

29. The method of claim 18, wherein the recording device joins the data session performed through a hunt group.

30. The method of claim 29, including the additional step of identifying the hunt group using a gatekeeper.

31. The method of claim 1, including the additional steps of passing telephone numbers to a gatekeeper for performing IP address resolution and using a resolved IP address of the second communication device in connecting the second communication device to the conference call, wherein the step of selectively entering the recording device to said conference call includes the step of directing the recording device to enter said conference call as the additional participant when a data session has been initiated.

32. The method of claim 31, wherein the recording device is directed to enter said conference call in response to a command that the data session is to be recorded.

33. The method of claim 32, including the additional steps of:
providing the command from a scheduler; and
analyzing information about the IP data session at the scheduler to determine whether the IP data session is to be recorded.

34. The method of claim 33, wherein the information includes the identity of at least one of the first and second communication devices.

35. The method of claim 1, wherein the step of selectively entering the recording device to said conference call includes the step of directing the recording device to enter said conference call as the additional participant in response to a command that the data session is to be recorded.

36. The method of claim 35, including the-additional steps of:
providing the command from a scheduler; and
analyzing information about the IP data session at the scheduler to determine whether the IP data session is to be recorded.

37. The method of claim 36, wherein the information includes the identity of at least one of the first and second communication devices.

38. The method of claim 1, including the additional steps of:
detecting the step of initiating the data session using a recording agent,
contacting the recording device using the recording agent, and
receiving a request to initiate the conference call and performing the implementing step in response to the request,
wherein the step of selectively entering the recording device to said conference call includes the step of directing the recording device to enter said conference call as the additional participant when a data session has been initiated.

39. The method of claim 38, including the additional steps of passing telephone numbers to a gatekeeper for performing IP address resolution and using a resolved IP address of the second communication device in connecting the second communication device to the conference call.

40. The method of claim 38, wherein the recording device is directed to enter said conference call in response to a command that the data session is to be recorded.

41. The method of claim 38, including the additional steps of:
providing the command from a scheduler; and
analyzing information about the IP data session at the scheduler to determine whether the IP data session is to be recorded.

42. The method of claim 41, wherein the information includes the identity of at least one of the first and second communication devices.

43. The method of claim 1, wherein the step of selectively entering the recording device to said conference call includes the steps of:
identifying a hunt group using a gatekeeper;
directing the recording device to enter said conference call as the additional participant in response to a command that the data session is to be recorded; and
joining the recording device to the data session through the hunt group.

44. The method of claim 43, including the additional steps of passing telephone numbers to a gatekeeper for performing IP address resolution and using a resolved IP address of the second communication device in connecting the second communication device to the conference call.

45. The method of claim 43, wherein the recording device is directed to enter said conference call in response to a command that the data session is to be recorded.

46. The method of claim 45, including the additional steps of:
providing the command from a scheduler; and
analyzing information about the IP data session at the scheduler to determine whether the IP data session is to be recorded.

47. The method of claim 46, wherein the information includes the identity of at least one of the first and second communication devices.

48. A method for recording at least a portion of an IP data session between at least a first communication device and a second communication device through a network by a recording device, comprising:
initiating the data session by said first communication device with said second communication device;
implementing the data session as a conference call through a conference controller such that said first and second communication devices are connected, respectively, as first and second participants;
using the conference controller, selectively entering the recording device to said conference call as an additional participant, wherein the recording device is distinct from the first and second communication devices yet receives as the additional participant at least the portion of the IP data session from each of the first and second participants; and
recording at least the portion of the IP data session received as the additional participant of said conference call using said recording device.

49. The method of claim 48, wherein the step of selectively entering the recording device to said conference call includes the step of directing the recording device to enter said conference call as the additional participant when a data session has been initiated.

50. The method of claim 48, including the additional step of permitting a user of at least one of the first and second communication devices to determine whether the session is to be recorded prior to entering the recording device as the additional participant.

51. The method of claim 48, wherein the connection of the second communication device is established by the conference controller by:
passing telephone numbers to a gatekeeper for performing IP address resolution, and
using a resolved IP address of the second communication device for connecting the second communication device to the conference call.

52. The method of claim 48, wherein the step of selectively entering the recording device to said conference call is in response to a command that the data session is to be recorded.

53. The method of claim 52, including the additional step of providing the command from a scheduler.

54. The method of claim 53, including the additional step of locating the scheduler with the recording device.

55. The method of claim 53, including the additional step of analyzing information about the IP data session at the scheduler to determine whether the IP data session is to be recorded.

56. The method of claim 55, wherein the information includes the identity of at least one of the first and second communication devices.

57. The method of claim 48, wherein the IP data session is either an IP telephony session or an IP multimedia session.

58. The method of claim 48, wherein the step of initiating the data session is detected by a recording agent, and wherein said recording agent contacts the recording device.

59. The method of claim 48, wherein said conference controller is a MCU.

60. The method of claim 48, wherein the conference controller implements said conference call in response to a request to initiate the conference call.

61. The method of claim 60, wherein the request is from at least one of the recording device, the first communication device, the second communication device, and an other component on the network.

62. The method of claim 48, wherein said first communication device is a gateway for receiving communication through a PSTN.

63. The method of claim 48, wherein the recording device joins the data session performed through a hunt group.

64. The method of claim 63, including the additional step of identifying the hunt group using a gatekeeper.

65. The method of claim 48, wherein at least one of the first communication device and the second communication device is a non-IP telephony device.

66. The method of claim 65, wherein the step of selectively entering the recording device to said conference call includes the step of directing the recording device to enter said conference call as the additional participant when a data session has been initiated.

67. The method of claim 65, wherein the connection of the second communication device is established by the conference controller by:
    passing telephone numbers to a gatekeeper for performing IP address resolution, and
    using a resolved IP address of the second communication device for connecting the second communication device to the conference call.

68. The method of claim 65, wherein the step of selectively entering the recording device to said conference call is in response to a command that the data session is to be recorded.

69. The method of claim 68, including the additional step of providing the command from a scheduler.

70. The method of claim 69, including the additional step of locating the scheduler with the recording device.

71. The method of claim 69, including the additional step of analyzing information about the IP data session at the scheduler to determine whether the IP data session is to be recorded.

72. The method of claim 71, wherein the information includes the identity of at least one of the first and second communication devices.

73. The method of claim 65 wherein the step of initiating the data session is detected by a recording agent, and wherein said recording agent contacts the recording device.

74. The method of claim 73, wherein said conference controller is a MCU.

75. The method of claim 73, wherein the conference controller implements said conference call in response to a request to initiate the conference call.

76. The method of claim 65, wherein the recording device joins the data session performed through a hunt group.

77. The method of claim 76, including the additional step of identifying the hunt group using a gatekeeper.

78. The method of claim 48, including the additional steps of passing telephone numbers to a gatekeeper for performing IP address resolution and using a resolved IP address of the second communication device in connecting the second communication device to the conference call, wherein the step of selectively entering the recording device to said conference call includes the step of directing the recording device to enter said conference call as the additional participant when a data session has been initiated.

79. The method of claim 78, wherein the recording device is directed to enter said conference call in response to a command that the data session is to be recorded.

80. The method of claim 79, including the additional steps of:
    providing the command from a scheduler; and
    analyzing information about the IP data session at the scheduler to determine whether the IP data session is to be recorded.

81. The method of claim 80, wherein the information includes the identity of at least one of the first and second communication devices.

82. The method of claim 48, wherein the step of selectively entering the recording device to said conference call includes the step of directing the recording device to enter said conference call as the additional participant in response to a command that the data session is to be recorded.

83. The method of claim 82, including the additional steps of:
    providing the command from a scheduler; and
    analyzing information about the IP data session at the scheduler to determine whether the IP data session is to be recorded.

84. The method of claim 83, wherein the information includes the identity of at least one of the first and second communication devices.

85. The method of claim 48, including the additional steps of:
    detecting the step of initiating the data session using a recording agent,
    contacting the recording device using the recording agent, and
    receiving a request to initiate the conference call and performing the implementing step in response to the request, wherein the step of selectively entering the recording device to said conference call includes the step of directing the recording device to enter said conference call as the additional participant when a data session has been initiated.

86. The method of claim 85, including the additional steps of passing telephone numbers to a gatekeeper for performing IP address resolution and using a resolved IP address of the second communication device in connecting the second communication device to the conference call.

87. The method of claim 85, wherein the recording device is directed to enter said conference call in response to a command that the data session is to be recorded.

88. The method of claim 85, including the additional steps of:
    providing the command from a scheduler; and
    analyzing information about the IP data session at the scheduler to determine whether the IP data session is to be recorded.

89. The method of claim 88, wherein the information includes the identity of at least one of the first and second communication devices.

90. The method of claim 48, wherein the step of selectively entering the recording device to said conference call includes the steps of:
  identifying a hunt group using a gatekeeper;
  directing the recording device to enter said conference call as the additional participant in response to a command that the data session is to be recorded; and
  joining the recording device to the data session through the hunt group.

91. The method of claim 90, including the additional steps of passing telephone numbers to a gatekeeper for performing IP address resolution and using a resolved IP address of the second communication device in connecting the second communication device to the conference call.

92. The method of claim 90, wherein the recording device is directed to enter said conference call in response to a command that the data session is to be recorded.

93. The method of claim 92, including the additional steps of:
  providing the command from a scheduler; and
  analyzing information about the IP data session at the scheduler to determine whether the IP data session is to be recorded.

94. The method of claim 93, wherein the information includes the identity of at least one of the first and second communication devices.

* * * * *

(12) INTER PARTES REEXAMINATION CERTIFICATE (0083rd)
United States Patent
Gritzer et al.

(10) Number: US 7,010,109 C1
(45) Certificate Issued: Jul. 28, 2009

(54) DIGITAL RECORDING OF IP BASED DISTRIBUTED SWITCHING PLATFORM

(75) Inventors: Hagay Gritzer, Maccabim (IL); Ilan Freedman, Petach Tikva (IL); Ilan Yosef, Pardesiia (IL); Danny Shporer, Rchovot (IL)

(73) Assignee: Nice Systems Ltd., Raanana (IL)

Reexamination Request:
No. 95/000,323, Nov. 21, 2007

Reexamination Certificate for:
Patent No.: 7,010,109
Issued: Mar. 7, 2006
Appl. No.: 10/906,962
Filed: Mar. 14, 2005

Related U.S. Application Data (63) Continuation of application No. 10/111,767, filed as application No. PCT/IL2001/000805 on Aug. 28, 2001, now Pat. No. 7,010,106.
(60) Provisional application No. 60/228,124, filed on Aug. 28, 2000.

(51) Int. Cl.
*H04M 3/42* (2006.01)

(52) U.S. Cl. .............. 379/202.01; 379/203.01; 379/265.06; 379/265.09

(58) Field of Classification Search .............. None
See application file for complete search history.

(56) References Cited

U.S. PATENT DOCUMENTS

| | | |
|---|---|---|
| 5,155,760 A | 10/1992 | Johnson et al. |
| 5,382,972 A | 1/1995 | Kannes |
| 5,440,624 A | 8/1995 | Schoof, II |
| 5,590,171 A | 12/1996 | Howe et al. |
| 5,655,081 A | 8/1997 | Bonnell et al. |
| 5,668,863 A | 9/1997 | Bieselin et al. |
| 5,710,591 A | 1/1998 | Bruno et al. |
| 5,712,903 A | 1/1998 | Bartholomew et al. |
| 5,757,889 A | 5/1998 | Ohtake et al. |
| 5,854,825 A | 12/1998 | Mukaihara et al. |
| 5,857,190 A | 1/1999 | Brown |
| 5,912,887 A | 6/1999 | Sehgal |
| 5,923,746 A | 7/1999 | Baker et al. |
| 5,991,373 A | 11/1999 | Pattison et al. |
| 6,006,254 A | 12/1999 | Waters et al. |
| 6,055,302 A | 4/2000 | Schmersel et al. |
| 6,122,740 A | 9/2000 | Andersen |
| 6,259,701 B1 | 7/2001 | Shur et al. |
| 6,263,049 B1 | 7/2001 | Kuhn |
| 6,298,129 B1 | 10/2001 | Culver et al. |

(Continued)

FOREIGN PATENT DOCUMENTS

| | | |
|---|---|---|
| DE | 19833969 | 2/2000 |
| DE | 103 24 872 | 12/2004 |
| EP | 0716533 | 6/1996 |
| EP | 0 846 395 | 6/1998 |
| EP | 0892530 | 1/1999 |

(Continued)

OTHER PUBLICATIONS

MBone Video Conference Recorder MAN Page, Nov. 5, 1995.

(Continued)

*Primary Examiner*—Ovidio Escalante (57) ABSTRACT

A system and method for recording and/or otherwise monitoring IP multimedia sessions. The present invention features a recording and/or monitoring device, referred to hereinafter as "a recording device" for the purposes of clarity only and without any intention of being limiting. The recording device is a participant in the IP multimedia session, although preferably the recording device only receives data for recording and/or otherwise monitoring the session. Therefore, the IP multimedia session is preferably a multi-user session, such as a "conference call" for example, even if data is being provided for recording from only one of the participants in the session.

U.S. PATENT DOCUMENTS

| | | | |
|---|---|---|---|
| 6,301,246 | B1 | 10/2001 | Shaffer et al. |
| 6,404,857 | B1 | 6/2002 | Blair et al. |
| 6,665,395 | B1 | 12/2003 | Busey et al. |
| 6,668,044 | B1 | 12/2003 | Schwartz et al. |
| 6,731,609 | B1 | 5/2004 | Hirni et al. |
| 6,876,734 | B1 | 4/2005 | Summers et al. |
| 2001/0043697 | A1 | 11/2001 | Cox et al. |

FOREIGN PATENT DOCUMENTS

| | | |
|---|---|---|
| EP | 0948163 | 10/1999 |
| EP | 1010314 | 6/2000 |
| EP | 1014633 | 6/2000 |
| EP | 1 115 264 | 7/2001 |
| EP | 0980608 | 10/2002 |
| EP | 1 335 571 | 8/2003 |
| EP | 1 351 436 | 10/2003 |
| EP | 1 432 217 | 6/2004 |
| EP | 1247386 | 10/2007 |
| JP | 09233113 | 9/1997 |
| JP | 10051460 | 2/1998 |
| JP | 2000174825 | 8/2000 |
| KR | 1020000027464 | 5/2000 |
| WO | WO-94 22246 | 9/1994 |
| WO | WO 98/51041 | 11/1998 |
| WO | WO 99/12329 | 3/1999 |
| WO | WO 99/23560 | 5/1999 |
| WO | WO 99/26409 | 5/1999 |
| WO | WO-99 46702 | 9/1999 |
| WO | WO 00/13075 | 3/2000 |
| WO | WO 00/22843 | 4/2000 |
| WO | WO 00/54468 | 9/2000 |
| WO | WO-02 19620 | 3/2002 |

OTHER PUBLICATIONS

Holfelder, W., "MBone VCR—Video Conference Recording on the MBone" in ACM Multimedia 95–Electronic Proceedings, 237–8 (Nov. 1995).

Glover, Mark V., "Internetworking: Distance Learning 'To Sea' via Desktop Videoconferencing Tools and IP Multicast Protocols" (Mar. 1998) (unpublished M. Sc. Thesis, Naval Postgraduate School, Monterey, California).

Deering, S., RFC 1112, "Host Extensions for IP Multicasting" (Aug. 1989).

"Apple Computer's Quicktime Conferencing Kit Now Shipping; ISDN Upgrade Kits Soon to Follow"; PR Newswire, Dec. 18, 1995.

"Internet Conferencing With Networked Virtual Environments", John and Elizabeth Towell, Internet Research, 1995 vol. 5, Issue 3, pp. 15–22.

"First Virtual Ports Products to Corporate Intranet, Enabling Business–Quality Videoconferencing, Video on Demand, and Live Broadcast From the Web Browser", PR Newswire, Jan. 27, 1997.

"Real–Time Disk Storage and Retrieval of Digital Audio/Video Data"; Anderson et al., UCal Berkeley EECS Dept., Aug. 1991.

Artis Uher Service Manual Telephone Monitoring Device (TMD), Room Monitoring Device (RMD) May 1995.

Nice Systems Ltd.: NiceCLS Call Logging System Release 4.1 User's Manual, Document No. 385A0052–06, Tel Avlv May 1998.

Nokia Networks Oy: Actionet System Critical Call Recording Interface Specification, Feb. 2000.

ECMA: Standard ECMA–217 Services for Computer Supported Telecommunications Applications (CSTA) Phase II, Dec. 1994.

Verordnung uber die technische Umsetzung von Uberwachungsmabnahmen des Fernmeldeverkehrs in Fernmeldeanlagen, die fur den offentllchen Verkehr bestimmt sind, vol. 18, May 1995.

Telecommunications security; Lawful Interception (LI); Handover interface for the lawful interception of telecommunications traffic, ETSI ES201671 v1.1.1 (1999).

3rd Generation Partnership Project; Technical Specification Group Services and Sytems Aspects; WG3 Security Lawful Interception Requirements; 3G TS 33.106 v3.0.0 (1999).

Definition of H.323, Wikipedia, http://de.wikipedia.org/wiki/H.323, Feb. 6, 2008.

INTER PARTES REEXAMINATION CERTIFICATE ISSUED UNDER 35 U.S.C. 316

THE PATENT IS HEREBY AMENDED AS INDICATED BELOW.

AS A RESULT OF REEXAMINATION, IT HAS BEEN DETERMINED THAT:

Claims 1–3, 5–6, 10–13, 15–19, 21–22, 26–30, 35, 38, 48–50, 52–53, 57–60, 62–66, 68–69, 73–77, 82 and 85 are cancelled.

Claims 4, 7–9, 14, 20, 23–25, 31–34, 36, 37, 39–47, 51, 54–56, 61, 67, 70–72, 78–81, 83, 84 and 86–94 were not reexamined.

\* \* \* \* \*